US012688527B2

(12) United States Patent (10) Patent No.: US 12,688,527 B2
Scheibelhut et al. (45) Date of Patent: Jul. 21, 2026

(54) USER INTERFACE FOR SELECTING SOURCES FOR AN ONLINE CONCIERGE SYSTEM WITH A QUICK-ADD OPTION FOR AN ITEM-SOURCE PAIR

(71) Applicant: Maplebear Inc., San Francisco, CA (US)

(72) Inventors: Brent Scheibelhut, Toronto (CA); Mark Oberemk, Toronto (CA); Shaun Navin Maharaj, Vaughan (CA)

(73) Assignee: Maplebear Inc., San Francisco, CA (US)

( * ) Notice: Subject to any disclaimer, the term of this patent is extended or adjusted under 35 U.S.C. 154(b) by 158 days.

(21) Appl. No.: 18/753,931

(22) Filed: Jun. 25, 2024

(65) Prior Publication Data

US 2025/0390935 A1 Dec. 25, 2025

(51) Int. Cl.
*G06Q 30/00* (2023.01)
*G06Q 30/0204* (2023.01)
*G06Q 30/0601* (2023.01)

(52) U.S. Cl.
CPC ..... *G06Q 30/0641* (2013.01); *G06Q 30/0205* (2013.01); *G06Q 30/0631* (2013.01); *G06Q 30/0633* (2013.01)

(58) Field of Classification Search
CPC .................................................. G06Q 30/0641
See application file for complete search history.

(56) References Cited

U.S. PATENT DOCUMENTS

| | | | | |
|---|---|---|---|---|
| 12,443,630 | B1 * | 10/2025 | Knight | G06F 16/24578 |
| 2014/0177212 | A1 * | 6/2014 | Li | H05B 45/385 |
| | | | | 362/190 |
| 2024/0403938 | A1 * | 12/2024 | Drerup | G06Q 30/0631 |
| 2025/0029172 | A1 * | 1/2025 | Golconda | G06Q 30/0625 |
| 2025/0259221 | A1 * | 8/2025 | Mesard | G06Q 30/0631 |

OTHER PUBLICATIONS

Abbar, Sofiane, et al. "Ranking item features by mining online user-item interactions." 2014 IEEE 30th International Conference on Data Engineering. IEEE, 2014.*

* cited by examiner

*Primary Examiner* — Kathleen Palavecino
(74) *Attorney, Agent, or Firm* — Fenwick & West LLP

(57) ABSTRACT

An online concierge system receives, from a client device associated with a user, a request to access a user interface including a listing of sources associated with the system, in which each source is associated with a catalog of items. The system retrieves user data describing interactions by the user with items available at the sources and accesses and applies a machine-learning model to predict a user engagement score for each item-source pair associated with the sources based on the user data, in which the score indicates a likelihood of an interaction by the user with an item available at a source. The system selects a set of item-source pairs based on the scores and generates the user interface including the listing and a selectable option to add an item associated with each selected pair to a shopping list. The system then sends the user interface to the client device.

20 Claims, 5 Drawing Sheets

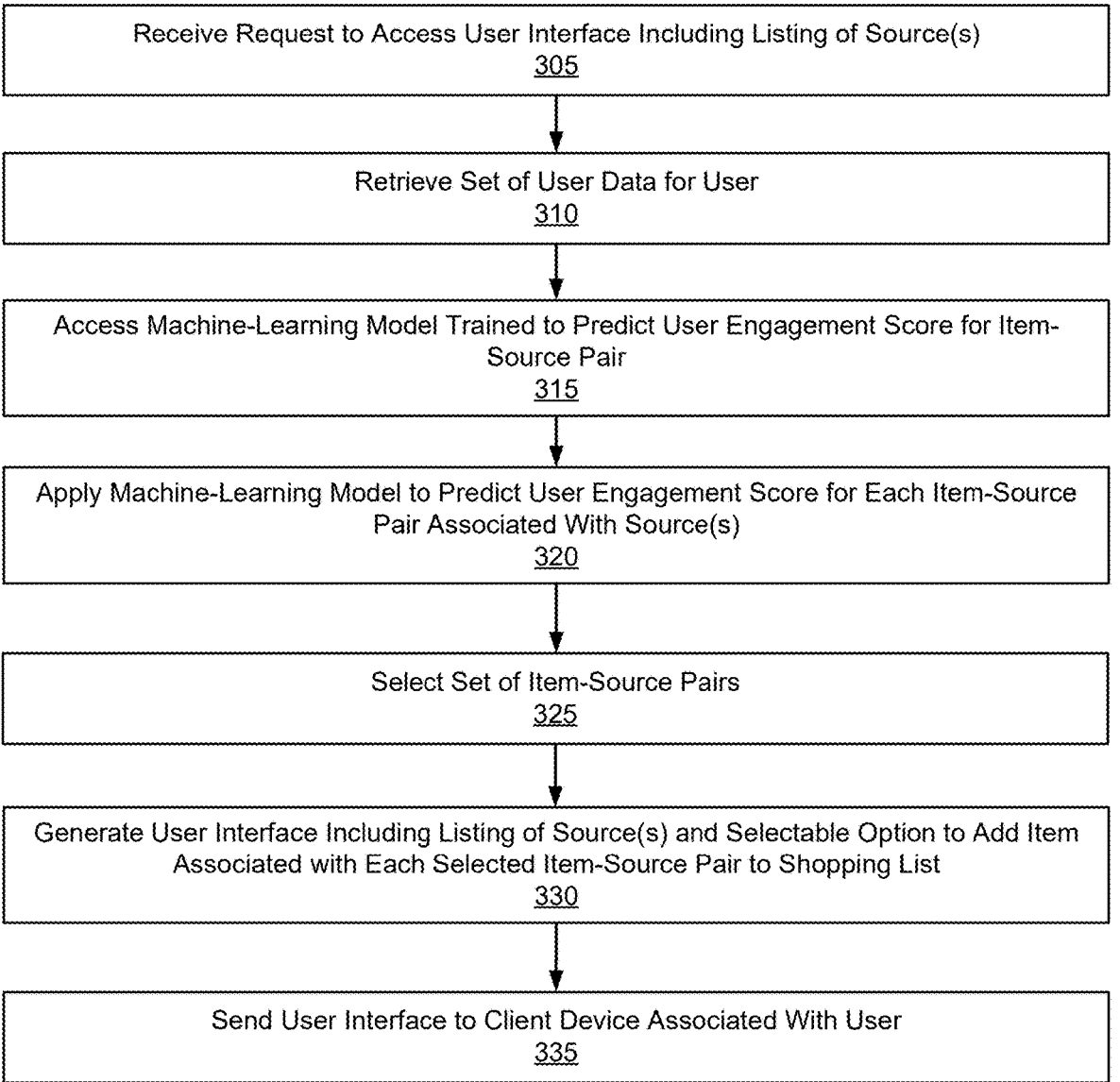

Receive Request to Access User Interface Including Listing of Source(s)
305

Retrieve Set of User Data for User
310

Access Machine-Learning Model Trained to Predict User Engagement Score for Item-Source Pair
315

Apply Machine-Learning Model to Predict User Engagement Score for Each Item-Source Pair Associated With Source(s)
320

Select Set of Item-Source Pairs
325

Generate User Interface Including Listing of Source(s) and Selectable Option to Add Item Associated with Each Selected Item-Source Pair to Shopping List
330

Send User Interface to Client Device Associated With User
335

USER INTERFACE FOR SELECTING SOURCES FOR AN ONLINE CONCIERGE SYSTEM WITH A QUICK-ADD OPTION FOR AN ITEM-SOURCE PAIR

BACKGROUND

Online concierge systems provide their users with the convenience of placing orders that are matched with pickers who service the orders on behalf of the users (e.g., by driving to sources, such as retailer locations, collecting items included in the orders, and delivering the orders to the users). Users may specify the sources from which items they order are to be collected by adding the items to shopping lists associated with the corresponding sources. For example, via an online concierge system, a user may add a first set of items to a first shopping list associated with a first source and a second set of items to a second shopping list associated with a second source, etc. In this example, once the user places an order including a set of items included in a shopping list associated with a source, the order specifies that each ordered item is to be collected from the source.

Despite the convenience provided by online concierge systems, since online concierge systems allow their users to specify different sources from which items they order are to be collected, the users may find it time consuming to add items to their shopping lists. In the above example, once the user accesses an ordering interface for the online concierge system, the user may first select a source to access a storefront for the source, search for an item, select an item from a list of search results, select a quantity of the item, and add the item to a shopping list associated with the source. In this example, the user may have to repeat this process for each item to be collected from a different source. As such, users of online concierge systems may find this process tedious, especially if the users often order the same items from the same sources on a regular basis.

SUMMARY

In accordance with one or more aspects of the disclosure, an online concierge system presents a user interface including a listing of sources associated with the online concierge system and a selectable option to add an item associated with an item-source pair to a shopping list. More specifically, the online concierge system receives, from a client device associated with a user, a request to access a user interface including a listing of one or more sources associated with the online concierge system, in which each source is associated with a catalog of items. The online concierge system retrieves a set of user data for the user, in which the user data includes information describing a set of interactions by the user with one or more items available at the source(s). The online concierge system accesses and applies a machine-learning model to predict a user engagement score for each item-source pair associated with the source(s) based on the set of user data for the user, in which the user engagement score indicates a likelihood of an interaction by the user with an item available at a source. The online concierge system then selects a set of item-source pairs based on the user engagement score for each item-source pair and generates the user interface including the listing of the source(s) and a selectable option to add, to a shopping list, an item associated with each selected item-source pair. The online concierge system sends the user interface to the client device associated with the user, causing the client device to display the user interface.

BRIEF DESCRIPTION OF THE DRAWINGS

FIG. 3 is a flowchart of a method for presenting a user interface including a listing of sources associated with an online concierge system and a selectable option to add an item associated with an item-source pair to a shopping list, in accordance with one or more embodiments.

DETAILED DESCRIPTION

Figure 1:
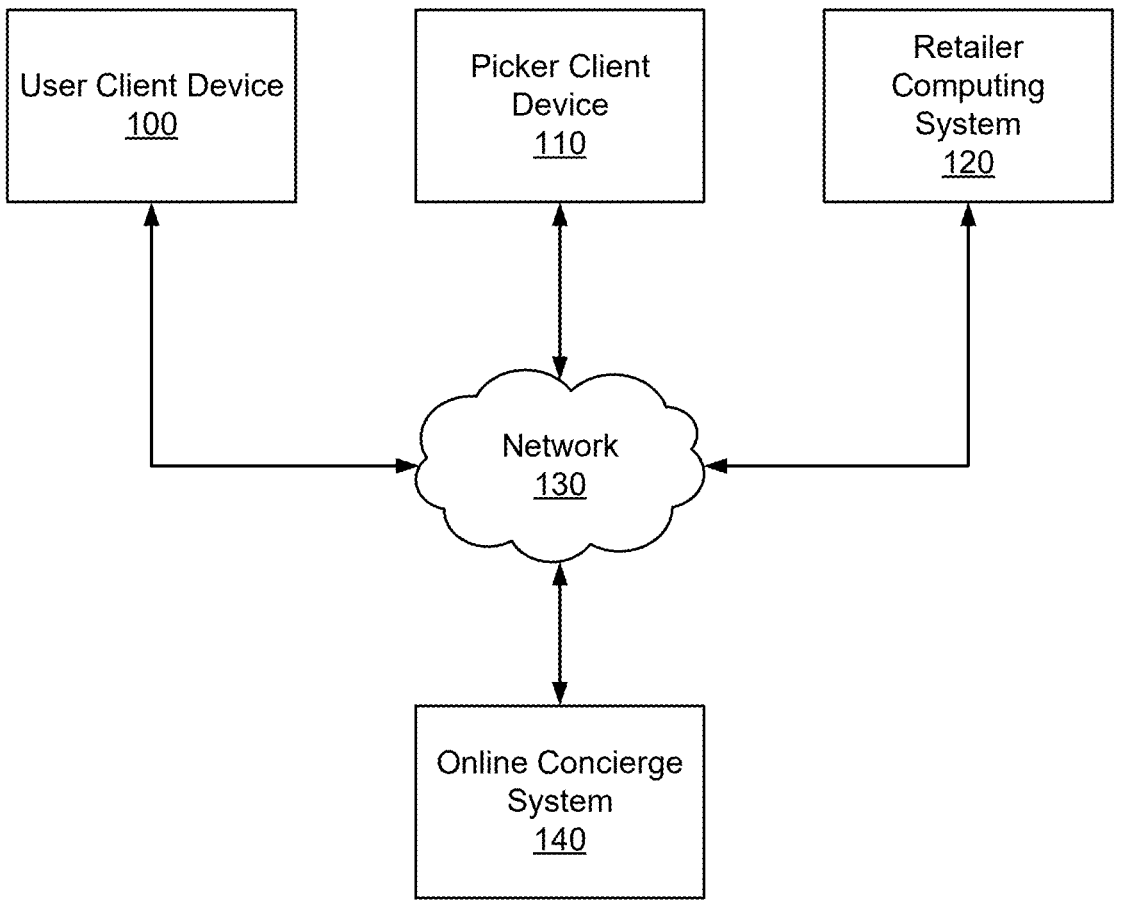
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a user client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and retailer computing system 120 are illustrated in FIG. 1, any number of users, pickers, and retailers may interact with the online concierge system 140. As such, there may be more than one user client device 100, picker client device 110, or retailer computing system 120.

The user client device 100 is a client device through which a user may interact with the picker client device 110, the retailer computing system 120, or the online concierge system 140. The user client device 100 may be a personal or mobile computing device, such as a smartphone, a tablet, a laptop computer, or a desktop computer. The user client device 100 also may be a smart shopping cart, which may include a wheeled cart, a shopping basket, etc. that may be used to carry items collected by the user. The smart shopping cart also may include a display area, various sensors (e.g., a scale, cameras, microphones, GPS sensors, etc.), speakers, buttons, or any other suitable components. Sensors of the smart shopping cart may have capabilities to identify items or other physical objects or to determine their attributes. For example, sensors of the smart shopping cart may include interior-facing cameras that capture images or videos of items placed in the smart shopping cart, as well as exterior-facing cameras that capture images or videos of items or other objects located elsewhere at a source. In this example, computer-vision techniques may be applied to the images or videos to identify the items in the smart shopping cart or to identify items or other objects within a threshold distance of the smart shopping cart depicted by the images/videos. Continuing with this example, the computer-vision techniques also may be applied to determine a shelf life of an item (e.g., based on a best by, a use by, or a sell by date printed on the item, a freshness of the item, etc.). In the above example, the sensors of the smart shopping cart also may include a laser sensor or an ultrasonic sensor that determines one or more dimensions of each item and a scale that determines the weight of each item in the smart shopping cart. In some embodiments, the user client device 100 executes a client application that uses an application programming interface (API) to communicate with the online concierge system 140.

A user uses the user client device 100 to place an order with the online concierge system 140. An order specifies a set of items to be delivered to the user. An "item," as used herein, refers to a good or product that may be provided to the user through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more sources from which the ordered items should be collected.

The user client device 100 presents an ordering interface to the user. The ordering interface is a user interface that the user may use to place an order with the online concierge system 140. The ordering interface may be part of a client application operating on the user client device 100. The ordering interface allows the user to search for items that are available through the online concierge system 140 and the user may select which items to add to a "shopping list." A "shopping list," as used herein, is a tentative set of items that the user has selected for an order but that has not yet been finalized for an order. The ordering interface allows a user to update the shopping list, e.g., by changing the quantity of items, adding or removing items, or adding instructions for items that specify how the items should be collected.

The user client device 100 may receive additional content from the online concierge system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online concierge system 140. In addition to text messages, the communication interfaces of the user client device 100 and the picker client device 110 may allow the user and the picker to communicate through audio or video communications, such as a phone call, a voice-over-IP call, or a video call.

One or more sensors of a user client device 100 associated with a user may collect contextual information associated with the user during a shopping session at a source. Contextual information may only be collected if a user has previously explicitly consented to the collection of contextual information associated with the user during the user's shopping session. Contextual information may describe a set of items collected by a user (e.g., items within a shopping basket being used by the user), a state of the user (e.g., whether the user is moving or stationary), a velocity or an orientation of the user, a location associated with the user (e.g., in a department or at a checkout stand or a sample kiosk within a source), etc. Contextual information may include image data, video data, audio data, etc. that may be collected by one or more sensors of a user client device 100 associated with a user. For example, contextual information associated with a user may include images or videos depicting items added to a smart shopping cart being used by the user. In this example, the contextual information also may include a location associated with the user within a source (e.g., a location of a user client device 100 associated with the user), such as an aisle, a department, or a sample kiosk within the source, and one or more attributes (e.g., a brand, a dimension, a weight, etc.) or a shelf life of each item. Contextual information also may be associated with various types of information, such as a name of a retailer that operates a source at which the contextual information was collected, a geographical location associated with the source, a time at which the contextual information was collected, information identifying a user or a purchase associated with the contextual information, etc. Once collected by a user client device 100, contextual information may be transmitted to the online concierge system 140 via the network 130.

The picker client device 110 is a client device through which a picker may interact with the user client device 100, the retailer computing system 120, or the online concierge system 140. The picker client device 110 may be a personal or mobile computing device, such as a smartphone, a tablet, a laptop computer, or a desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a source. The picker client device 110 presents the items that are included in the user's order to the picker in a collection interface. The collection interface is a user interface that provides information to the picker identifying items to collect for a user's order and the quantities of the items. In some embodiments, the collection interface provides multiple orders from multiple users for the picker to service at the same time from the same source. The collection interface further presents instructions that the user may have included related to the collection of items in the order. Additionally, the collection interface may present a location of each item at the source, and may even specify a sequence in which the picker should collect the items for improved efficiency in collecting items. In some embodiments, the picker client device 110 transmits to the online concierge system 140 or the user client device 100 which items the picker has collected in real time as the picker collects the items.

The picker may use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in a source to receive the weight of an item.

When the picker has collected all of the items for an order, the picker client device 110 provides instructions to a picker for delivering the items for a user's order. For example, the picker client device 110 displays a delivery location from the order to the picker. The picker client device 110 also provides navigation instructions for the picker to travel from a source to a delivery location. When a picker is servicing more than one order, the picker client device 110 identifies which items should be delivered to which delivery location. The picker client device 110 may provide navigation instructions from the source to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the source from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the user client device 100 for display to the user, so that the user can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a source and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the source. In these embodiments, each person may have a picker client device 110 that they can use to interact with the online concierge system 140. Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a user from a retailer location.

The retailer computing system 120 is a computing system operated by a retailer that interacts with the online concierge system 140. As used herein, a "retailer" is an entity that operates a "source," which is a retailer location (e.g., a store), a warehouse, or other building or location from which a picker can collect items or from which a user may purchase items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at a source. Furthermore, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The user client device 100, the picker client device 110, the retailer computing system 120, and the online concierge system 140 may communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which users can order items to be provided to them by a picker from a source. The online concierge system 140 receives orders from a user client device 100 through the network 130. The online concierge system 140 selects a picker to service the user's order and transmits the order to a picker client device 110 associated with the picker. The picker collects the ordered items from a source and delivers the ordered items to the user. The online concierge system 140 may charge a user for the order and provide portions of the payment from the user to the picker and the retailer. As an example, the online concierge system 140 may allow a user to order groceries from a grocery store retailer. The user's order may specify which groceries they want delivered from the grocery store and the quantities of each of the groceries. The user's client device 100 transmits the user's order to the online concierge system 140 and the online concierge system 140 selects a picker to travel to the grocery store retailer location to collect the groceries ordered by the user. Once the picker has collected the groceries ordered by the user, the picker delivers the groceries to a location transmitted to the picker client device 110 by the online concierge system 140. The online concierge system 140 is described in further detail below with regards to FIG. 2.

Figure 2:
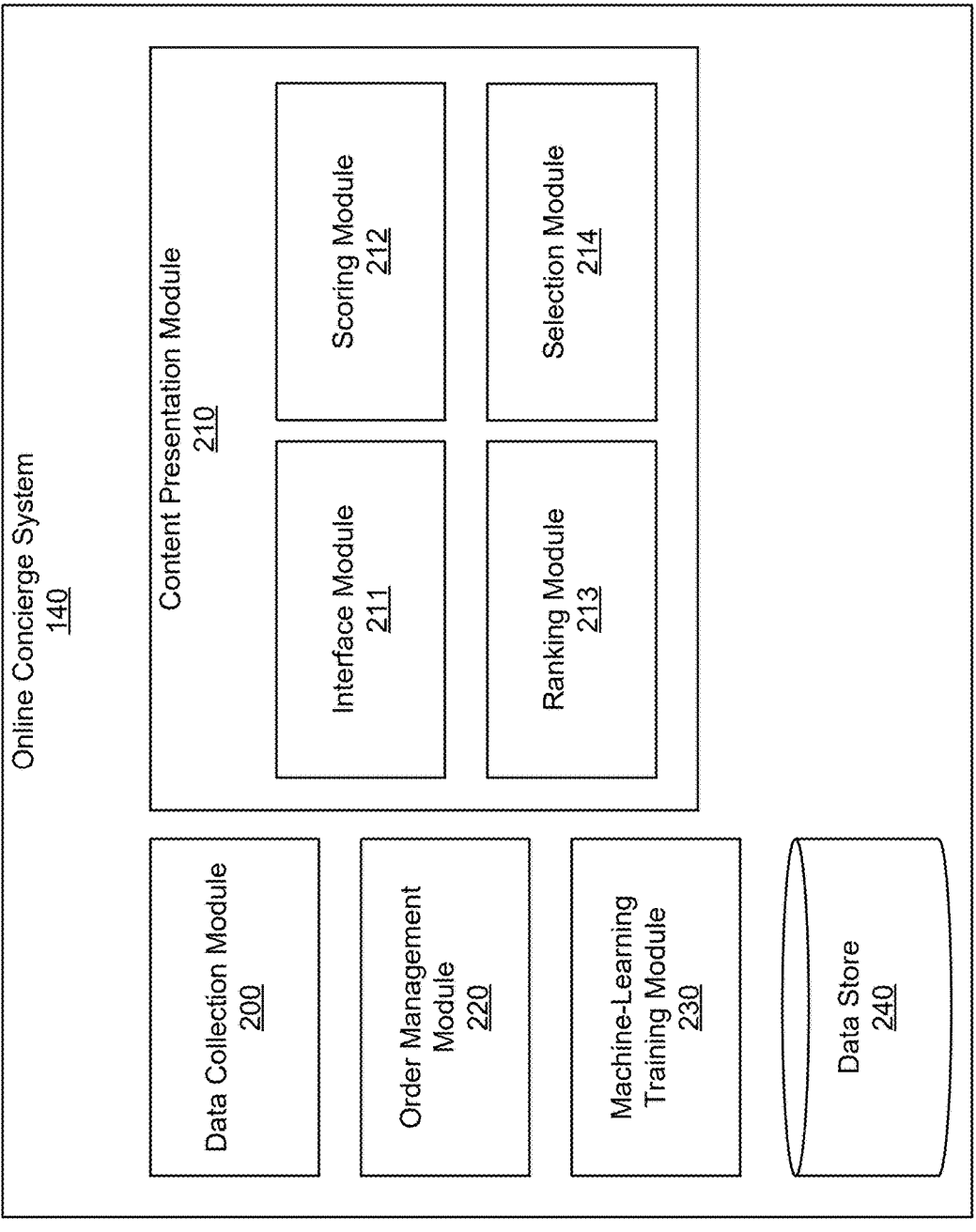
FIG. 2 illustrates an example system architecture for an online concierge system, in accordance with one or more embodiments.

FIG. 2 illustrates an example system architecture for an online concierge system, in accordance with some embodiments. The system architecture illustrated in FIG. 2 includes a data collection module 200, a content presentation module 210, an order management module 220, a machine-learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

The data collection module 200 collects user data, which is information or data describing characteristics of a user. User data may include a user's name, address, shopping preferences, dietary restrictions/preferences, or stored payment instruments. For example, the user data may include a user's shopping preferences, such as their preferred or favorite sources or their preferred or favorite items to order or purchase from particular sources. User data also may include a user's interests or hobbies, as well as demographic information associated with the user (e.g., age, gender, geographical region, educational background, occupation, etc.) or household information associated with the user (e.g., a number of people in the user's household, whether the user's household includes children or pets, etc.). Additionally, user data may include a user's geographical location (e.g., a geographical location of a user client device 100 associated with the user) or a current time associated with the user (e.g., a date, a time of day, a day of the week, a season, etc. based on a time zone of the user's geographical location). The user data also may include default settings established by the user, such as a default retailer/source, payment instrument, delivery location, or delivery timeframe. In some embodiments, user data also includes one or more user engagement scores associated with a user, as further described below.

User data also may include historical information associated with a user, such as historical interaction information. Historical interaction information may describe a set of previous interactions by a user with one or more items presented by the online concierge system 140. For example, historical interaction information may describe each item presented by the online concierge system 140 with which a user interacted (e.g., an item category, a size, a brand, a price, etc. associated with each item) and a type of each interaction (e.g., searching for an item, adding an item to a shopping list, etc.), as well as each item presented by the online concierge system 140 with which the user did not interact. In the above example, the historical interaction information also may describe a time associated with each interaction (e.g., a time at which a search query for an item was received, a time an item was added to a shopping list, etc.) and a time at which each item with which the user did not interact was presented to the user. Continuing with this example, the historical interaction information may describe a source associated with each interaction (e.g., a source associated with a catalog of items in which an item presented to the user is included).

Historical interaction information also may describe a set of previous interactions by a user with a third-party website from which the user accessed the online concierge system 140 (e.g., via a link on the third-party website) or information describing a set of interactions by the user with content from which the user accessed the online concierge system 140. For example, suppose that a user accessed the online concierge system 140 via a link included in a recipe sharing website, in which the link is associated with an item corresponding to an ingredient of the recipe. In this example, historical interaction information may describe interactions by the user with the recipe sharing website, such as recipes the user accessed, saved, or browsed. As an additional example, suppose that a user accessed the online concierge system 140 by clicking on a link included in an email, a push notification, a content item (e.g., an advertisement, a social media post, etc.), a video, a recipe, or any other suitable types of content. In this example, historical interaction information may describe the content in which the link was included and a time at which the user accessed the online concierge system 140 via the link.

User data further may include additional types of historical information associated with a user, such as historical location information, historical conversion information, historical contextual information, or any other suitable types of historical information. For example, user data may include historical location information describing countries, states, cities, towns, restaurants, stores, etc., previously associated with a user (e.g., based on GPS coordinates of a user client device 100 associated with the user). As an additional example, user data may include historical conversion information, such as historical order information associated with a user describing previous orders placed by the user or historical purchase information associated with the user describing previous purchases made by the user. In this example, the historical conversion information may describe one or more items included in each order or purchase (e.g., an item category, a size, a brand, a quantity, a price, ingredients, etc. associated with each item), a time associated with each order or purchase, a source from which the item(s) included in each order was/were collected or at which each purchase was made, etc. In the above example, the user data also may include historical contextual information collected during the user's previous shopping sessions at one or more sources, such as information describing items the user added to or removed from a shopping cart or a shopping basket being used by the user, a shelf life of each item, etc.

The data collection module 200 may collect the user data from sensors on the user client device 100 or based on the user's interactions with the online concierge system 140. The data collection module 200 also may collect the user data via various analytics tools or techniques, such as third-party cookies, tracking tools (e.g., email, link, or click tracking tools), uniform resource locator (URL) parameters, application programming interfaces (APIs), etc. The data collection module 200 also may collect the user data from other components of the online concierge system 140.

The data collection module 200 also collects item data, which is information or data identifying and describing items that are available at a source. The item data may include item identifiers for items that are available and may include quantities of items associated with each item identifier. Additionally, item data may also include attributes of items such as the sizes, colors, weights, stock keeping units (SKUs), serial numbers, prices, item categories, brands, qualities (e.g., freshness, ripeness, etc.), ingredients, materials, manufacturing locations, versions/varieties (e.g., flavors, low fat, gluten-free, organic, etc.), availabilities/seasonalities, or any other suitable attributes of the items. The item data also may include a shelf life of each item, which may be based on a best by, a use by, or a sell by date printed on the item, a freshness of the item, a harvest date of the item, a packaging date of the item, a manufacturing date of the item, or any other suitable types of information. The item data may further include purchasing rules associated with each item, if they exist. For example, age-restricted items such as alcohol and tobacco are flagged accordingly in the item data. Item data may also include information that is useful for predicting the availability of items at sources. For example, for each item-source pair (a particular item at a particular source), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or a user client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. In some embodiments, item categories may be broader in that the same item category may include item types that are related to a common theme, found in the same department, etc. For example, items such as apples, oranges, lettuce, and cucumbers may be included in a "produce" item category. Furthermore, in various embodiments, an item may be included in multiple categories. For example, croissants may be included in a "croissant" item category, a "pastry" item category, and a "bakery" item category.

The item categories may be human-generated and human-populated with items. The item categories also may be generated automatically by the online concierge system 140 (e.g., using a clustering algorithm).

The data collection module 200 also collects picker data, which is information or data describing characteristics of pickers. For example, the picker data for a picker may include the picker's name, the picker's location, how often the picker has serviced orders for the online concierge system 140, a user rating for the picker, the sources from which the picker has collected items, or the picker's previous shopping history. Additionally, the picker data may include preferences expressed by the picker, such as their preferred sources for collecting items, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects conversion data, which is information or data describing characteristics of an order or a purchase. For example, conversion data may include item data for items that are included in an order, a delivery location for the order, a user associated with the order, a retailer location from which the user wants the ordered items collected, or a timeframe within which the user wants the order delivered. As an additional example, conversion data may include item data for items that are included in a purchase, user data for a user who made the purchase, and information describing the purchase (e.g., a source from which the user purchased the items and a date and a time of the purchase). Conversion data may further include information describing how an order was serviced, such as which picker serviced the order, when the order was delivered, or a rating that the user gave the delivery of the order. Conversion data also may include user data for users associated with orders or purchases, such as user data for a user who placed an order or made a purchase or picker data for a picker who serviced an order.

The data collection module 200 also may derive information from other data stored in the data store 240 and store this derived information in the data store 240 (e.g., in association with the data from which it was derived). For example, suppose that a set of user data for a user describes previous orders placed by the user with the online concierge system 140 or previous purchases made by the user at various sources. In the above example, based on the previous orders/purchases made by the user, the data collection module 200 may derive a frequency with which the user orders/purchases items associated with various attributes (e.g., an item category, a ripeness, a color, a brand, a weight, etc.), a percentage of items the user orders/purchases that are on sale, and types of items that the user orders/purchases from a particular source. As an additional example, based on item data for an item describing a harvest date for an item and a shelf life of the item, the data collection module 200 may derive a freshness or a ripeness of the item based on an amount of time elapsed since the harvest date and an amount of time between a current time and an end of the shelf life of the item.

The content presentation module 210 selects content for presentation to a user. For example, the content presentation module 210 selects which items to present to a user while the user is placing an order. Components of the content presentation module 210 include: an interface module 211, a scoring module 212, a ranking module 213, and a selection module 214, which are further described below.

The interface module 211 generates and transmits an ordering interface for the user to order items. The interface module 211 populates the ordering interface with items that the user may select for adding to their order. In some embodiments, the interface module 211 presents a catalog of all items that are available to the user, which the user can browse to select items to order. Other components of the content presentation module 210 may identify items that the user is most likely to order and the interface module 211 may then present those items to the user. For example, the scoring module 212 may score items and the ranking module 213 may rank the items based on their scores. In this example, the selection module 214 may select items with scores that exceed some threshold (e.g., the top n items or the p percentile of items) and the interface module 211 then displays the selected items.

The scoring module 212 may use an item selection model to score items for presentation to a user. An item selection model is a machine-learning model that is trained to score items for a user based on item data for the items and user data for the user. For example, the item selection model may be trained to determine a likelihood that the user will order an item. In some embodiments, the item selection model uses item embeddings describing items and user embeddings describing users to score items. These item embeddings and user embeddings may be generated by separate machine-learning models and may be stored in the data store 240.

In some embodiments, the scoring module 212 scores items based on a search query received from the user client device 100. A search query is free text for a word or set of words that indicate items of interest to the user. The scoring module 212 scores items based on a relatedness of the items to the search query. For example, the scoring module 212 may apply natural language processing (NLP) techniques to the text in the search query to generate a search query representation (e.g., an embedding) that represents characteristics of the search query. The scoring module 212 may use the search query representation to score candidate items for presentation to a user (e.g., by comparing a search query embedding to an item embedding).

In some embodiments, the scoring module 212 scores items based on a predicted availability of an item. The scoring module 212 may use an availability model to predict the availability of an item. An availability model is a machine-learning model that is trained to predict the availability of an item at a particular source. For example, the availability model may be trained to predict a likelihood that an item is available at a retailer location or may predict an estimated number of items that are available at a retailer location. The scoring module 212 may apply a weight to the score for an item based on the predicted availability of the item. Alternatively, an item may be filtered out from presentation to a user by the selection module 214 based on whether the predicted availability of the item exceeds a threshold.

The scoring module 212 also may retrieve a set of user data for a user from the data store 240. The set of user data may describe a set of previous interactions by the user with one or more items available at one or more sources. For example, a set of user data retrieved by the scoring module 212 may include historical interaction information describing a set of previous interactions by a user with one or more items presented by the online concierge system 140. In this example, the historical interaction information also may describe a set of previous interactions by the user with one or more items presented by a third-party website from which the user accessed the online concierge system 140 or a set of previous interactions by the user with one or more items associated with content from which the user accessed the online concierge system 140. Continuing with this example, the set of user data also may include historical contextual information describing a set of previous interactions by the user with one or more items during one or more previous shopping sessions. The set of user data retrieved by the scoring module 212 may include historical information associated with the user (e.g., historical interaction, conversion, contextual, or location information), information describing the user's shopping or dietary preferences, demographic or household information associated with the user, information describing the user's interests or hobbies, the user's geographical location, or a current time associated with the user. The set of user data also may include information that may be derived from any types of user data described above, or any other suitable types of information.

In some embodiments, the scoring module 212 also retrieves additional types of information from the data store 240, such as item data associated with one or more item-source pairs, or any other suitable types of information. For example, for each of one or more sources associated with the online concierge system 140 (e.g., one or more sources within a threshold distance of a geographical location associated with a user), the scoring module 212 may retrieve a set of item data associated with each item-source pair (a particular item at a particular source) associated with a corresponding source. In this example, the set of item data may include attributes of an item associated with the item-source pair, such as an item category, a brand, a size, a price, etc. associated with the item or a freshness, an availability, etc. of the item.

The scoring module 212 also may predict a user engagement score for an item-source pair. A user engagement score is specific to a user and indicates a likelihood of an interaction by the user with an item available at a source. For example, a user engagement score for an item-source pair may indicate a likelihood that a user will add an item associated with the item-source pair to a shopping list associated with a source associated with the item-source pair. A user engagement score may correspond to a value, such as a number or a percentage. For example, a user engagement score for an item-source pair may correspond to a value from 0 to 1, in which a value of 0 indicates a user is highly unlikely to interact with an item available at a source and a value of 1 indicates the user is highly likely to interact with the item available at the source. The scoring module 212 may predict a user engagement score for an item-source pair based on information retrieved by the scoring module 212, such as a set of user data for a user, a set of item data associated with the item-source pair, or any other suitable types of information. For example, the scoring module 212 may predict a user engagement score for an item-source pair based on a set of user data for a user including historical interaction or conversion information associated with the user, information describing the user's shopping preferences, dietary preferences, interests, or hobbies, demographic or household information associated with the user, etc. In the above example, the scoring module 212 also may predict the user engagement score for the item-source pair based on a set of item data for an item associated with the item-source pair, such as an item category, a brand, a size, a price, a freshness, an availability, etc. associated with the item.

A user engagement score for an item-source pair may be proportional to one or more values included among a set of user data for a user or a set of item data associated with the item-source pair. For example, a user engagement score for an item-source pair may be proportional to a number of times or a frequency with which a user previously ordered or purchased an item associated with the item-source pair from a source associated with the item-source pair or to a percentage of times the user previously ordered/purchased the item from the source. In this example, the user engagement score may be proportional to a freshness or an availability of the item or to a number of times or a frequency with which the user added the item to a shopping list associated with the source within a threshold amount of time of placing an order with the source. In the above example, the availability may be a predicted availability of the item (e.g., currently or at a time of day or day of the week at which the user previously ordered/purchased the item from the source) or a number of the item available at the source. In this example, the user engagement score may be proportional to a measure of similarity between an amount of time elapsed since the user last ordered/purchased the item and a shelf life of the purchased item or a measure of similarity between times at which the user previously ordered/purchased the item from the source (e.g., a time of day or day of the week) and a current time associated with the user. Additionally, in this example, the user engagement score may be proportional to a measure of similarity between one or more attributes of the item (e.g., size, version, price, etc.) and the corresponding attribute(s) of the item the user previously ordered/purchased from the source.

The following example illustrates various factors that may affect a user engagement score for the item-source pair based on a set of user data for a user or a set of item data associated with an item-source pair. If an item associated with an item-source pair was ordered by a user from a source associated with the item-source pair within a threshold amount of time of a current time, a user engagement score for the item-source pair may be higher if the item was out of stock or lower if it was in stock. In the above example, the user engagement score may be higher if the item is associated with content with which the user interacted on a third-party website from which the user accessed the online concierge system 140 and even higher if one or more additional items in the shopping list are also associated with the content. In this example, the user engagement score may be lower if the item is not associated with the content or already included in a shopping list associated with the source. In the above example, the user engagement score may be higher if the item is associated with a geographical location or a current time associated with the user or lower if it is not (e.g., if the item is sunblock, the user engagement score may be higher if the geographical location is a beach rather than a building and the current time is noon rather than midnight). In this example, the user engagement score may be higher if the item is associated with a sale, a discount, an offer, etc. or lower if it is not. In the above example, the user engagement score may be higher if a quantity of the item that is available or predicted to be available at the source is at least equal to an average quantity of the item the user orders/purchases from the source or lower if it is less. In this example, the user engagement score may be higher if the item has at least a threshold measure of similarity to another item the user added to but later removed from a shopping list, cart, or basket associated with the source within a threshold amount of time of a current time, or lower if another item having at least the threshold measure of similarity to the item was later added.

In some embodiments, the scoring module 212 predicts a user engagement score for an item-source pair using an engagement prediction model, which is a machine-learning model trained to predict a user engagement score for an item-source pair. To use the engagement prediction model, the scoring module 212 may access the model (e.g., from the data store 240) and apply the model to a set of inputs. The set of inputs may include one or more types of data retrieved by the scoring module 212 described above or any other suitable types of information. For example, the scoring module 212 may access and apply the engagement prediction model to a set of inputs including a set of user data describing a set of previous interactions by a user with an item available at a source, a set of previous conversions by the user associated with the item available at the source, etc.

In the above example, the set of inputs also may include a set of item data for the item. Once the scoring module 212 applies the engagement prediction model to a set of inputs, the scoring module 212 may receive an output from the model, which may include a value corresponding to a user engagement score for an item-source pair. In some embodiments, the engagement prediction model is trained by the machine-learning training module 230, as described below.

In various embodiments, a user engagement score for an item-source pair is specific to a quantity or an amount, such that the user engagement score indicates a likelihood of an interaction by a user with the quantity or the amount of the item available at a source. In such embodiments, the scoring module 212 may predict the user engagement score based on information specific to the quantity or amount in a manner analogous to that described above. For example, a user engagement score for an item-source pair that is specific to a quantity or an amount may be proportional to a number of times or a frequency with which a user previously ordered or purchased the quantity/amount of an item associated with the item-source pair from a source associated with the item-source pair, a percentage of times the user previously ordered/purchased the quantity/amount of the item from the source, etc. In the above example, to predict the user engagement score, the scoring module 212 also may access and apply the engagement prediction model to a set of inputs including the number of times or the frequency with which the user previously ordered or purchased the quantity/amount of the item from the source, the percentage of times the user previously ordered/purchased the quantity/amount of the item from the source, etc.

Once the scoring module 212 predicts a user engagement score for an item-source pair, it may communicate the user engagement score to the data collection module 200, which may store the user engagement score in the data store 240. A user engagement score may be stored among a set of user data for a user associated with the score. Additionally, a user engagement score may be stored in association with various types of information, such as information describing an item-source pair for which it was predicted, a time at which it was predicted, a quantity or an amount specific to the user engagement score (if any), or any other suitable types of information.

The ranking module 213 may rank item-source pairs associated with one or more sources. The ranking module 213 may do so based on a user engagement score for each item-source pair or any other suitable types of information. For example, the ranking module 213 may rank item-source pairs from highest to lowest based on a user engagement score for each item, such that an item-source pair associated with a highest score is ranked first, an item-source pair associated with a second-highest score is ranked second, etc. In some embodiments, the ranking module 213 excludes one or more item-source pairs from being ranked. For example, if an item associated with an item-source pair is already included in a shopping list associated with a source associated with the item-source pair, the ranking module 213 may not rank the item-source pair. As an additional example, if an item associated with an item-source pair has at least a threshold measure of similarity to another item included in a shopping list associated with a source associated with the item-source pair (e.g., if both items are associated with the same item category, size, version, ingredients, etc., but different brands), the ranking module 213 may not rank the item-source pair.

The selection module 214 may select a set of item-source pairs to include in a user interface including a listing of one or more sources. The selection module 214 may do so based on a user engagement score for each item-source pair (e.g., by selecting a set of item-source pairs with user engagement scores that exceed some threshold) or any other suitable types of information. In embodiments in which the ranking module 213 ranks item-source pairs, the selection module 214 selects the set of item-source pairs based on a ranking of the set of item-source pairs (e.g., by selecting the top n ranked item-source pairs). In some embodiments, the selection module 214 may not select one or more item-source pairs (e.g., for the same reason the ranking module 213 may exclude the item-source pair(s) from being ranked). In various embodiments, the selection module 214 selects the set of item-source pairs based on a number of sources that may be accommodated by a display area of a user client device 100 in which the user interface is to be displayed. The number of sources that may be accommodated by the display area may correspond to a default number of sources or to a number of sources identified by the interface module 211, as described below. For example, suppose that the user interface may accommodate a total of nine sources or item-source pairs. In this example, if the interface module 211 identifies six sources, the selection module 214 may select three item-source pairs, while if the interface module 211 identifies eight sources, the selection module 214 may select one item-source pair. The selection module 214 also may select the set of item-source pairs based on a type of the user client device 100 (e.g., a mobile device, a desktop device, a smart shopping cart, etc.). For example, if a user client device 100 at which the user interface is to be displayed has a large display area (e.g., if the user client device 100 is a desktop device or a smart shopping cart), the selection module 214 may select more item-source pairs to include in the user interface than it may if the user interface has a small display area (e.g., if the user client device 100 is a smartphone).

The interface module 211 may receive a request from a user client device 100 associated with a user to access a user interface (e.g., the ordering interface described above) that includes a listing of one or more sources associated with the online concierge system 140 (e.g., one or more sources within a threshold distance of a geographical location associated with the user). Each source included in the listing may be associated with a catalog of items that a user may order from the source. Furthermore, each source included in the listing may be associated with an interactive element with which a user may interact. For example, by selecting a button associated with a source from the listing, a user may access a page (e.g., a storefront) associated with a corresponding source from which the user may browse items available at the source, add items to a shopping list associated with the source, place an order with the source, etc.

The interface module 211 also generates the user interface that includes the listing of one or more sources and a selectable option to add, to a shopping list, an item associated with each item-source pair of a set of item-source pairs selected by the selection module 214. The interface module 211 may generate the user interface based on a set of user data for a user to whom the user interface is to be presented (e.g., a user associated with a user client device 100 from which a request to access the user interface is received). For example, based on a geographical location associated with a user (e.g., a geographical location of a user client device 100 associated with the user), the interface module 211 may identify one or more sources within a threshold distance of the geographical location associated with the user. In this example, the interface module 211 may then generate the user interface based on the identified source(s), such that the user interface includes a listing of the identified source(s). The listing of the source(s) may include information identifying each source, such as a name of the source, an icon representing the source, a name of a retailer that operates the source, an icon representing the retailer, etc. The listing of the source(s) also may include additional information associated with each source, such as hours of operation for the source, an estimated delivery time for orders placed with the source, a distance between the geographical location associated with the user and the source, or any other suitable types of information.

The user interface may include one or more interactive elements associated with each item-source pair with which a user may interact to add a corresponding item to a shopping list associated with a corresponding source. For example, the user interface may include an "add" button associated with each item-source pair with which a user may interact to add an item associated with the item-source pair to a shopping list associated with a source associated with the item-source pair. In some embodiments, the user interface also includes one or more additional interactive elements associated with each item-source pair with which a user may interact to specify a quantity or an amount of an item associated with an item-source pair to a shopping list associated with a corresponding source. In the above example, the user interface also may include an interactive element associated with each item-source pair that indicates a quantity or an amount of an item associated with each item-source pair that may be added to a shopping list associated with a corresponding source. Continuing with this example, the user may interact with the interactive element to increase or decrease the quantity/amount. In this example, once the user has selected a quantity/amount of an item associated with an item-source pair, the user may interact with the "add" button associated with the item-source pair to add the specified quantity/amount of the item to a shopping list associated with a source associated with the item-source pair. In embodiments in which a user engagement score for an item-source pair included in the user interface is specific to a quantity or an amount, the quantity/amount may be included in the user interface. In the above example, if a user engagement score for each item-source pair is specific to a quantity or an amount, the interactive element associated with each item-source pair may indicate a default amount corresponding to the quantity/amount.

Once the interface module 211 generates the user interface, the interface module 211 may send the user interface to a user client device 100 associated with a user, causing the user client device 100 to display the user interface. The user may then interact with the user interface (e.g., by adding an item associated with an item-source pair to a shopping list associated with a source associated with the item-source pair, selecting a source from the listing of the source(s), searching for an item, etc.). The interface module 211 may then receive a request from the user client device 100 to select a selectable option to add an item associated with an item-source pair to a shopping list associated with a source associated with the item-source pair. Responsive to receiving the request, the interface module 211 may update the user interface to include items included among a catalog of items associated with the corresponding source (e.g., by updating the user interface to include a page (e.g., a storefront) associated with the source). Responsive to receiving the request, the interface module 211 also may update the user interface by updating the shopping list associated with the source to include the added item (e.g., based on an amount/quantity specified in the request).

The order management module 220 manages orders for items from users. The order management module 220 receives orders from user client devices 100 and assigns the orders to pickers for service based on picker data. For example, the order management module 220 assigns an order to a picker based on the picker's location and the retailer location from which the ordered items are to be collected. The order management module 220 may also assign an order to a picker based on how many items are in the order, a vehicle operated by the picker, the delivery location, the picker's preferences for how far to travel to deliver an order, the picker's ratings by users, or how often the picker agrees to service an order.

In some embodiments, the order management module 220 determines when to assign an order to a picker based on a delivery timeframe requested by the user who placed the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the source associated with the order. If the order includes items to collect from multiple sources, the order management module 220 identifies the sources to the picker and may also specify a sequence in which the picker should visit the sources.

The order management module 220 may track the location of the picker through the picker client device 110 to determine when the picker arrives at a source. When the picker arrives at the source, the order management module 220 transmits the order to the picker client device 110 for display to the picker. As the picker uses the picker client device 110 to collect items at the source, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within a source. The order management module 220 uses sensor data from the picker client device 110 or from sensors in the source to determine the location of the picker in the source. The order management module 220 may transmit, to the picker client device 110, instructions to display a map of the source indicating where in the source the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from a source to a delivery location, or to a subsequent source for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes a total cost for the order and charges the user that cost. The order management module 220 may provide a portion of the total cost to the picker for servicing the order, and another portion of the total cost to the retailer.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model is used by the machine-learning model to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or conversion data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

In embodiments in which the scoring module 212 accesses and applies the engagement prediction model to predict a user engagement score for an item-source pair, the machine-learning training module 230 may train the engagement prediction model. The machine-learning training module 230 may train the engagement prediction model via supervised learning or using any other suitable technique or combination of techniques based on data stored in the data store 240 or any other suitable types of data. For example, the machine-learning training module 230 may train the engagement prediction model based on user data, item data, or any other types of data stored in the data store 240.

To illustrate an example of how the machine-learning training module 230 may train the engagement prediction model, suppose that the machine-learning training module 230 receives a set of training examples including various attributes of items (e.g., item categories, brands, etc.) available at various sources. In this example, the set of training examples also may include various attributes of users of the online concierge system 140, which may describe historical, conversion, contextual, or location information associated with each user, information describing each user's shopping or dietary preferences, demographic or household information associated with each user, information describing each user's interests, hobbies, geographical location, etc. In the above example, the machine-learning training module 230 also may receive labels which represent expected outputs of the engagement prediction model, in which a label describes, for each item available at a source, an interaction by one or more users with a corresponding item available at a corresponding source (e.g., adding the item to a shopping list associated with the source). Continuing with this example, the machine-learning training module 230 may then train the engagement prediction model based on the attributes, as well as the labels by comparing its output from input data of each training example to the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In situations in which the training example includes a label, the loss function is also based on the label for the training example. Some example loss functions include the mean square error function, the mean absolute error, the hinge loss function, and the cross-entropy loss function. The machine-learning training module 230 updates the set of parameters for the machine-learning model based on the score generated by the loss function. For example, the machine-learning training module 230 may apply gradient descent to update the set of parameters.

In one or more embodiments, the machine-learning training module 230 may retrain the machine-learning model based on the actual performance of the model after the online concierge system 140 has deployed the model to provide service to users. For example, if the machine-learning model is used to predict a likelihood of an outcome of an event, the online concierge system 140 may log the prediction and an observation of the actual outcome of the event. Alternatively, if the machine-learning model is used to classify an object, the online concierge system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online concierge system 140 as a whole in its performance of the tasks described herein.

The data store 240 stores data used by the online concierge system 140. For example, the data store 240 stores user data, item data, conversion data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

Presenting a User Interface Including a Listing of Sources Associated with an Online Concierge System and a Selectable Option to Add an Item Associated with an Item-Source Pair to a Shopping List FIG. 3 is a flowchart of a method for presenting a user interface including a listing of sources associated with an online concierge system and a selectable option to add an item associated with an item-source pair to a shopping list, in accordance with some embodiments. Alternative embodiments may include more, fewer, or different steps from those illustrated in FIG. 3, and the steps may be performed in a different order from that illustrated in FIG. 3. These steps may be performed by an online concierge system (e.g., online concierge system 140). Additionally, each of these steps may be performed automatically by the online concierge system 140 without human intervention.

The online concierge system 140 receives 305 (e.g., via the interface module 211) a request from a user client device 100 associated with a user to access a user interface (e.g., the ordering interface described above) that includes a listing of one or more sources associated with the online concierge system 140 (e.g., one or more sources within a threshold distance of a geographical location associated with the user). Each source included in the listing may be associated with a catalog of items that the user may order from the source. Furthermore, each source included in the listing may be associated with an interactive element with which the user may interact. For example, by selecting a button associated with a source from the listing, the user may access a page (e.g., a storefront) associated with a corresponding source from which the user may browse items available at the source, add items to a shopping list associated with the source, place an order with the source, etc.

The online concierge system 140 may retrieve 310 (e.g., using the scoring module 212) a set of user data for the user (e.g., from the data store 240). The set of user data may describe a set of previous interactions by the user with one or more items available at the source(s). The set of user data retrieved 310 by the online concierge system 140 may include historical information associated with the user (e.g., historical interaction, conversion, contextual, or location information), information describing the user's shopping or dietary preferences, demographic or household information associated with the user, information describing the user's interests or hobbies, the user's geographical location, or a current time associated with the user. The set of user data also may include information that may be derived from any types of user data described above, or any other suitable types of information. In some embodiments, the online concierge system 140 also retrieves (step 310) additional types of information (e.g., from the data store 240), such as item data associated with one or more item-source pairs associated with the source(s), or any other suitable types of information.

The online concierge system 140 may then predict (e.g., using the scoring module 212) a user engagement score for each item-source pair associated with the source(s). A user engagement score is specific to the user and indicates a likelihood of an interaction by the user with an item available at a source. For example, a user engagement score for an item-source pair may indicate a likelihood that the user will add an item associated with the item-source pair to a shopping list associated with a source associated with the item-source pair. A user engagement score may correspond to a value, such as a number or a percentage. The online concierge system 140 may predict a user engagement score for an item-source pair based on information retrieved 310 by the online concierge system 140, such as the set of user data for the user, a set of item data associated with the item-source pair, or any other suitable types of information. A user engagement score for an item-source pair may be proportional to one or more values included among the set of user data for the user or a set of item data associated with the item-source pair or affected by various factors based on the set of user data or the set of item data.

In some embodiments, the online concierge system 140 predicts a user engagement score for an item-source pair using an engagement prediction model, which is a machine-learning model trained to predict a user engagement score for an item-source pair. To use the engagement prediction model, the online concierge system 140 may access 315 (e.g., using the scoring module 212) the model (e.g., from the data store 240) and apply 320 (e.g., using the scoring module 212) the model to a set of inputs. The set of inputs may include one or more types of data retrieved 310 by the online concierge system 140 described above or any other suitable types of information. Once the online concierge system 140 applies 320 the engagement prediction model to the set of inputs, the online concierge system 140 may receive (e.g., via the scoring module 212) an output from the model, which may include a value corresponding to a user engagement score for an item-source pair. In some embodiments, the engagement prediction model is trained by the online concierge system 140 (e.g., using the machine-learning training module 230).

In various embodiments, a user engagement score for an item-source pair is specific to a quantity or an amount, such that the user engagement score indicates a likelihood of an interaction by the user with the quantity or the amount of the item available at a source. In such embodiments, the online concierge system 140 may predict the user engagement score based on information specific to the quantity or amount in a manner analogous to that described above.

Once the online concierge system 140 predicts a user engagement score for an item-source pair, it may store (e.g., using the data collection module 200) the user engagement score (e.g., in the data store 240). A user engagement score may be stored among a set of user data for the user. Additionally, a user engagement score may be stored in association with various types of information, such as information describing an item-source pair for which it was predicted, a time at which it was predicted, a quantity or an amount specific to the user engagement score (if any), or any other suitable types of information.

The online concierge system 140 may then rank (e.g., using the ranking module 213) the item-source pairs associated with the source(s). The online concierge system 140 may do so based on a user engagement score for each item-source pair or any other suitable types of information. In some embodiments, the online concierge system 140 excludes (e.g., using the ranking module 213) one or more item-source pairs from being ranked (e.g., if an item associated with an item-source pair is already included in a shopping list associated with a source associated with the item-source pair or has at least a threshold measure of similarity to another item in the shopping list).

The online concierge system 140 may then select 325 (e.g., using the selection module 214) a set of item-source pairs to include in the user interface. The online concierge system 140 may do so based on a user engagement score for each item-source pair (e.g., by selecting 325 a set of item-source pairs with user engagement scores that exceed some threshold) or any other suitable types of information. In embodiments in which the online concierge system 140 ranks the item-source pairs, the online concierge system 140 selects 325 the set of item-source pairs based on a ranking of the set of item-source pairs (e.g., by selecting 325 the top n ranked item-source pairs). In some embodiments, the online concierge system 140 may not select 325 one or more item-source pairs (e.g., for the same reason the online concierge system 140 may exclude the item-source pair(s) from being ranked). In various embodiments, the online concierge system 140 selects 325 the set of item-source pairs based on a number of sources that may be accommodated by a display area of the user client device 100 associated with the user. The number of sources that may be accommodated by the display area may correspond to a default number of sources or to a number of sources identified by the online concierge system 140, as described below. The online concierge system 140 also may select 325 the set of item-source pairs based on a type of the user client device 100 (e.g., a mobile device, a desktop device, a smart shopping cart, etc.).

Figure 4A:
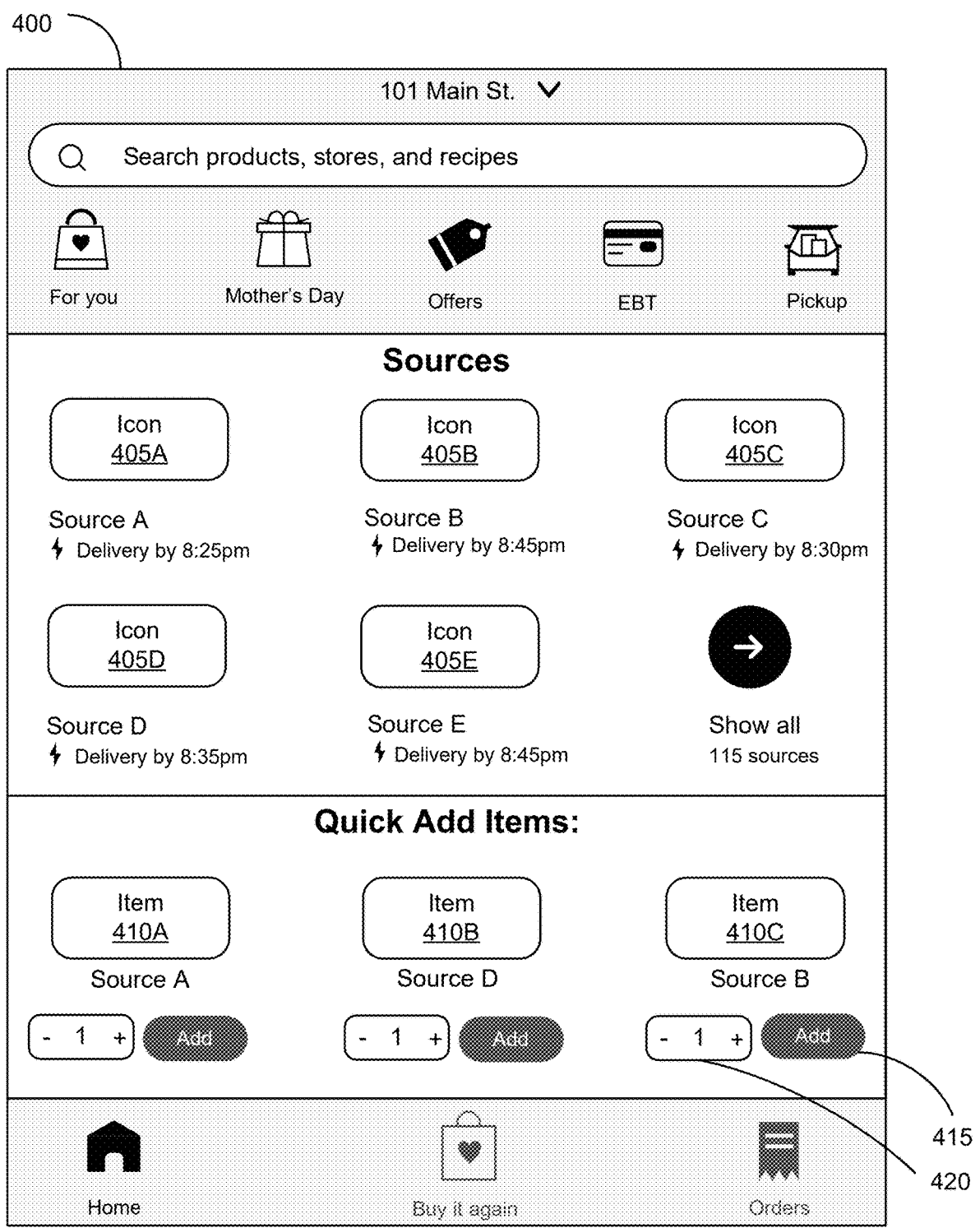
FIG. 4A illustrates an example of a user interface including a listing of sources associated with an online concierge system and a selectable option to add an item associated with an item-source pair to a shopping list, in accordance with one or more embodiments.

The online concierge system 140 then generates 330 (e.g., using the interface module 211) the user interface that includes the listing of the source(s) and a selectable option to add, to a shopping list, an item associated with each item-source pair of the set of item-source pairs selected 325 by the online concierge system 140. The online concierge system 140 may generate 330 the user interface based on the set of user data for the user (e.g., based on a geographical location associated with the user, such that the source(s) are within a threshold distance of the geographical location associated with the user). The listing of the source(s) may include information identifying each source, such as a name of the source, an icon representing the source, a name of a retailer that operates the source, an icon representing the retailer, etc. FIG. 4A illustrates an example of a user interface including a listing of sources associated with an online concierge system and a selectable option to add an item associated with an item-source pair to a shopping list, in accordance with one or more embodiments. As shown in FIG. 4A, the user interface 400 may include an icon 405A-E representing each source located above a name of each source. The listing of the source(s) also may include additional information associated with each source, such as hours of operation for the source, an estimated delivery time for orders placed with the source, a distance between the geographical location associated with the user and the source, or any other suitable types of information.

The user interface 400 may include one or more interactive elements associated with each item-source pair with which the user may interact to add a corresponding item to a shopping list associated with a corresponding source. For example, as shown in FIG. 4A, the user interface 400 may include an "add" button 415 associated with each item-source pair with which the user may interact to add an item 410A-C associated with the item-source pair to a shopping list associated with a source associated with the item-source pair. In some embodiments, the user interface 400 also includes one or more additional interactive elements associated with each item-source pair with which the user may interact to specify a quantity or an amount of an item 410 associated with an item-source pair to a shopping list associated with a corresponding source. As shown in FIG. 4A, the user interface 400 also may include an interactive element 420 associated with each item-source pair that indicates a quantity or an amount of an item 410 associated with each item-source pair that may be added to a shopping list associated with a corresponding source. In this example, the user may interact with the interactive element 420 to increase or decrease the quantity/amount. Continuing with this example, once the user has selected a quantity/amount of an item 410 associated with an item-source pair, the user may interact with the "add" button 415 associated with the item-source pair to add the specified quantity/amount of the item 410 to a shopping list associated with a source associated with the item-source pair. In embodiments in which a user engagement score for an item-source pair included in the user interface 400 is specific to a quantity or an amount, the quantity/amount may be included in the user interface 400. In the above example, if a user engagement score for each item-source pair is specific to a quantity or an amount, the interactive element 420 associated with each item-source pair may indicate a default amount corresponding to the quantity/amount.

Figure 4B:
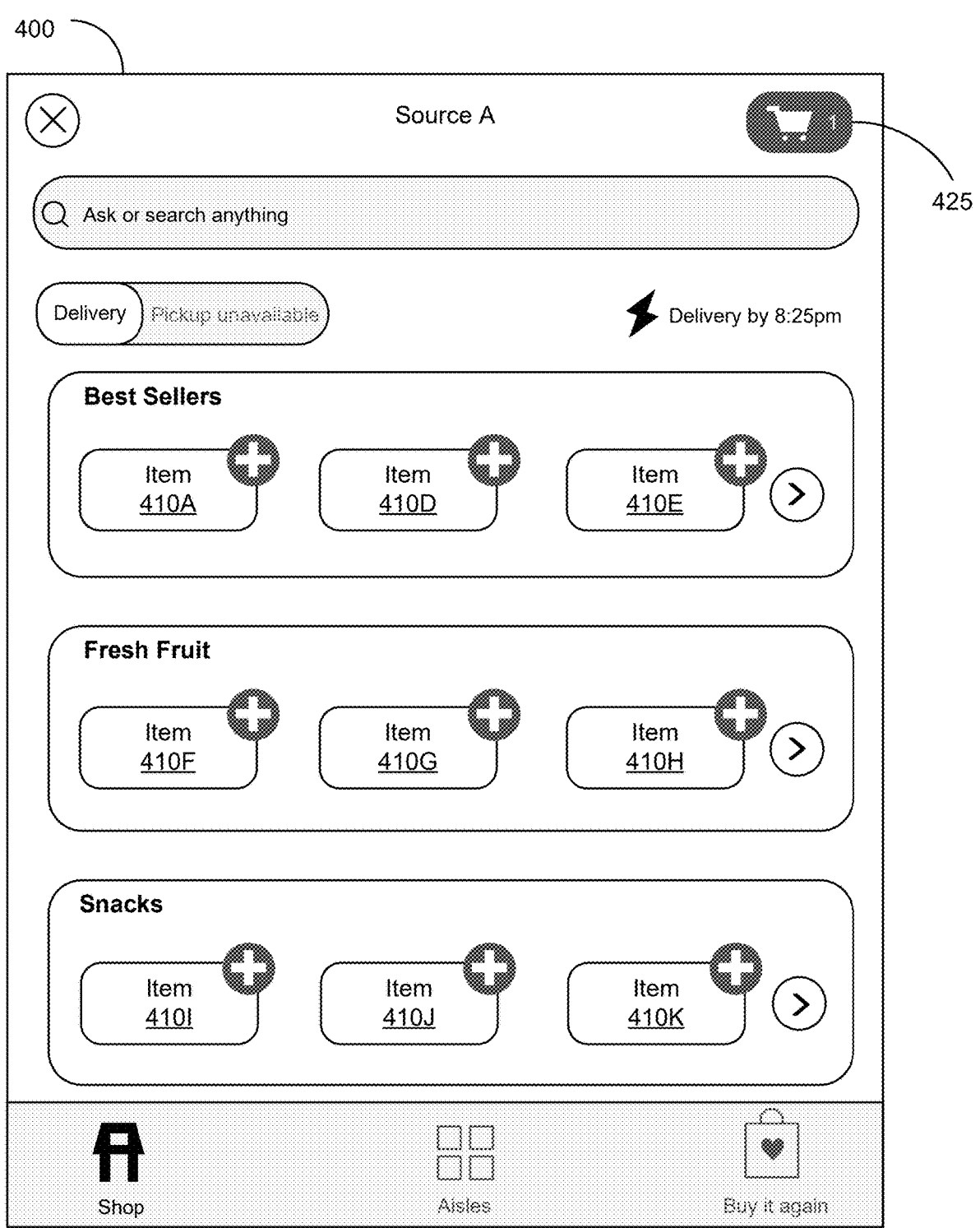
FIG. 4B illustrates an example of a user interface including items included in a catalog of items associated with an item-source pair, in accordance with one or more embodiments.

Referring back to FIG. 3, once the online concierge system 140 generates 330 the user interface 400, the online concierge system 140 may send 335 the user interface 400 to the user client device 100 associated with the user, causing the user client device 100 to display the user interface 400. The user may then interact with the user interface 400 (e.g., by adding an item 410 associated with an item-source pair to a shopping list associated with a source associated with the item-source pair, selecting a source from the listing of the source(s), searching for an item 410, etc.). The online concierge system 140 may then receive (e.g., via the interface module 211) a request from the user client device 100 to select a selectable option to add an item 410 associated with an item-source pair to a shopping list associated with a source associated with the item-source pair. Responsive to receiving the request, the online concierge system 140 may update (e.g., using the interface module 211) the user interface 400 to include items 410 included among a catalog of items 410 associated with the corresponding source. For example, referring again to FIG. 4A, suppose that the online concierge system 140 receives a request to select a selectable option to add a quantity of one of item 410A to a shopping list associated with Source A. Responsive to receiving the request, the online concierge system 140 may update the user interface 400 to include a page corresponding to a storefront for Source A, as shown in FIG. 4B, which illustrates an example of a user interface including items included in a catalog of items associated with an item-source pair, in accordance with one or more embodiments. Responsive to receiving the request, the online concierge system 140 also may update the user interface 400 by updating the shopping list associated with the source to include the added item 410 (e.g., based on an amount/quantity specified in the request). Continuing with the above example, suppose that prior to adding item 410A to the shopping list associated with Source A, the shopping list was empty. As shown in FIG. 4B, once item 410A is added to the shopping list, a quantity 425 of items 410 included in the shopping list associated with Source A also may be updated to indicate it includes one item 410.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:

receiving, from a client device associated with a user of an online concierge system, a request to access a user interface comprising a listing of one or more sources associated with the online concierge system, wherein each source of the one or more sources is associated with a different source location and a catalog of items;

retrieving a set of user data for the user, wherein the set of user data comprises information describing a set of interactions by the user with one or more items available at the one or more sources;

accessing a machine-learning model trained to predict a user engagement score for an item-source pair, wherein the user engagement score indicates a likelihood of an interaction by the user with an item available at a source and the machine-learning model is trained by:

receiving item data for a plurality of items available at a plurality of sources, receiving user data for a plurality of users of the online concierge system, receiving, for each item of the plurality of items available at each source of the plurality of sources, a label describing the interaction by one or more users with a corresponding item available at a corresponding source, and training the machine-learning model based at least in part on the item data, the user data, and the label for each item available at each source;

applying the machine-learning model to predict the user engagement score for each item-source pair associated with the one or more sources based at least in part on the set of user data for the user;

selecting a set of item-source pairs based at least in part on the user engagement score for each item-source pair associated with the one or more sources;

generating the user interface comprising the listing of the one or more sources associated with the online concierge system and a selectable option to add, to a shopping list, an item associated with at least two item-source pairs of the selected set of item-source pairs, wherein the at least two item-source pairs are associated with different sources; and sending the user interface to the client device associated with the user, wherein sending the user interface causes the client device to display the user interface.

2. The method of claim 1, further comprising:

responsive to receiving a request to select the selectable option to add an item associated with an item-source pair to the shopping list, updating the user interface to include a plurality of items included in the catalog of items associated with a corresponding item-source pair.

3. The method of claim 1, further comprising:

responsive to receiving a request to select the selectable option to add an item associated with an item-source pair to the shopping list, updating the shopping list to include the item associated with an item-source pair.

4. The method of claim 1, wherein the user engagement score for the item-source pair is specific to one or more of a quantity or an amount of the item available at the source.

5. The method of claim 1, wherein retrieving the set of user data for the user comprises retrieving information describing one or more of: a set of interactions by the user with a third-party website from which the user accessed the online concierge system, a set of interactions by the user with content from which the user accessed the online concierge system, a set of interactions by the user with one or more items during a previous shopping session, a set of previous conversions by the user, a time at which the user added an item to a shopping list, a shelf life associated with a previous conversion by the user, a geographical location associated with the user, one or more attributes of an item with which the user previously interacted, one or more attributes of an item associated with a previous conversion by the user, or a current time associated with the user.

6. The method of claim 5, wherein retrieving information describing a set of interactions by the user with content from which the user accessed the online concierge system comprises retrieving information describing a set of interactions by the user with one or more of: an email, a push notification, a content item, or a video.

7. The method of claim 5, wherein retrieving information describing a set of previous conversions by the user comprises retrieving one or more of: information describing a set of items associated with each conversion of the set of previous conversions, information describing a frequency of a conversion associated with an item by the user, information describing a time of each conversion of the set of previous conversions, or information describing a source associated with each conversion of the set of previous conversions.

8. The method of claim 1, further comprising:
retrieving a set of item data associated with each item-source pair associated with the one or more sources, wherein the set of item data comprises one or more of: information describing an availability of an item associated with each item-source pair or information describing a freshness of an item associated with each item-source pair.

9. The method of claim 8, wherein applying the machine-learning model to predict the user engagement score for each item-source pair associated with the one or more sources based at least in part on the set of user data for the user comprises applying the machine-learning model to predict the user engagement score for each item-source pair associated with the one or more sources based on the set of item data associated with each item-source pair associated with the one or more sources.

10. The method of claim 1, wherein selecting the set of item-source pairs based at least in part on the user engagement score for each item-source pair associated with the one or more sources comprises selecting the set of item-source pairs based on a number of sources included in the listing of the one or more sources associated with the online concierge system.

11. A computer program product comprising a non-transitory computer-readable storage medium having instructions encoded thereon that, when executed by a processor, cause the processor to perform steps comprising:
receiving, from a client device associated with a user of an online concierge system, a request to access a user interface comprising a listing of one or more sources associated with the online concierge system, wherein each source of the one or more sources is associated with a different source location and a catalog of items;
retrieving a set of user data for the user, wherein the set of user data comprises information describing a set of interactions by the user with one or more items available at the one or more sources;
accessing a machine-learning model trained to predict a user engagement score for an item-source pair, wherein the user engagement score indicates a likelihood of an interaction by the user with an item available at a source and the machine-learning model is trained by:
receiving item data for a plurality of items available at a plurality of sources, receiving user data for a plurality of users of the online concierge system,
receiving, for each item of the plurality of items available at each source of the plurality of sources, a label describing the interaction by one or more users with a corresponding item available at a corresponding source, and
training the machine-learning model based at least in part on the item data, the user data, and the label for each item available at each source;
applying the machine-learning model to predict the user engagement score for each item-source pair associated with the one or more sources based at least in part on the set of user data for the user;
selecting a set of item-source pairs based at least in part on the user engagement score for each item-source pair associated with the one or more sources;
generating the user interface comprising the listing of the one or more sources associated with the online concierge system and a selectable option to add, to a shopping list, an item associated with at least two item-source pairs of the selected set of item-source pairs, wherein the at least two item-source pairs are associated with different sources; and
sending the user interface to the client device associated with the user, wherein sending the user interface causes the client device to display the user interface.

12. The computer program product of claim 11, wherein the computer-readable storage medium further has instructions encoded thereon that, when executed by the processor, cause the processor to perform steps comprising:
responsive to receiving a request to select the selectable option to add an item associated with an item-source pair to the shopping list, updating the user interface to include a plurality of items included in the catalog of items associated with a corresponding item-source pair.

13. The computer program product of claim 11, wherein the computer-readable storage medium further has instructions encoded thereon that, when executed by the processor, cause the processor to perform steps comprising:
responsive to receiving a request to select the selectable option to add an item associated with an item-source pair to the shopping list, updating the shopping list to include the item associated with an item-source pair.

14. The computer program product of claim 11, wherein the user engagement score for the item-source pair is specific to one or more of a quantity or an amount of the item available at the source.

15. The computer program product of claim 11, wherein retrieving the set of user data for the user comprises retrieving information describing one or more of: a set of interactions by the user with a third-party website from which the user accessed the online concierge system, a set of interactions by the user with content from which the user accessed the online concierge system, a set of interactions by the user with one or more items during a previous shopping session, a set of previous conversions by the user, a time at which the user added an item to a shopping list, a shelf life associated with a previous conversion by the user, a geographical location associated with the user, one or more attributes of an item with which the user previously interacted, one or more attributes of an item associated with a previous conversion by the user, or a current time associated with the user.

16. The computer program product of claim 15, wherein retrieving information describing a set of interactions by the user with content from which the user accessed the online concierge system comprises retrieving information describing a set of interactions by the user with one or more of: an email, a push notification, a content item, or a video.

17. The computer program product of claim 15, wherein retrieving information describing a set of previous conversions by the user comprises retrieving one or more of: information describing a set of items associated with each conversion of the set of previous conversions, information describing a frequency of a conversion associated with an item by the user, information describing a time of each conversion of the set of previous conversions, or information describing a source associated with each conversion of the set of previous conversions.

18. The computer program product of claim 11, wherein the computer-readable storage medium further has instructions encoded thereon that, when executed by the processor, cause the processor to perform steps comprising:

retrieving a set of item data associated with each item-source pair associated with the one or more sources, wherein the set of item data comprises one or more of: information describing an availability of an item associated with each item-source pair or information describing a freshness of an item associated with each item-source pair.

19. The computer program product of claim 18, wherein applying the machine-learning model to predict the user engagement score for each item-source pair associated with the one or more sources based at least in part on the set of user data for the user comprises applying the machine-learning model to predict the user engagement score for each item-source pair associated with the one or more sources based on the set of item data associated with each item-source pair associated with the one or more sources.

20. A computer system comprising:

a processor; and a non-transitory computer-readable storage medium storing instructions that, when executed by the processor, perform actions comprising:

receiving, from a client device associated with a user of an online concierge system, a request to access a user interface comprising a listing of one or more sources associated with the online concierge system, wherein each source of the one or more sources is associated with a different source location and a catalog of items;

retrieving a set of user data for the user, wherein the set of user data comprises information describing a set of interactions by the user with one or more items available at the one or more sources;

accessing a machine-learning model trained to predict a user engagement score for an item-source pair, wherein the user engagement score indicates a likelihood of an interaction by the user with an item available at a source and the machine-learning model is trained by:

receiving item data for a plurality of items available at a plurality of sources, receiving user data for a plurality of users of the online concierge system, receiving, for each item of the plurality of items available at each source of the plurality of sources, a label describing the interaction by one or more users with a corresponding item available at a corresponding source, and training the machine-learning model based at least in part on the item data, the user data, and the label for each item available at each source;

applying the machine-learning model to predict the user engagement score for each item-source pair associated with the one or more sources based at least in part on the set of user data for the user;

selecting a set of item-source pairs based at least in part on the user engagement score for each item-source pair associated with the one or more sources;

generating the user interface comprising the listing of the one or more sources associated with the online concierge system and a selectable option to add, to a shopping list, an item associated with at least two item-source pairs of the selected set of item-source pairs, wherein the at least two item-source pairs are associated with different sources; and sending the user interface to the client device associated with the user, wherein sending the user interface causes the client device to display the user interface.

* * * * *